United States Patent [19]
Chiba et al.

[11] Patent Number: 5,574,326
[45] Date of Patent: Nov. 12, 1996

[54] VIBRATION ACTUATOR

[75] Inventors: Ichiro Chiba; Jun Tamai, both of Yokohama, Japan

[73] Assignee: Canon Kabushiki Kaisha, Tokyo, Japan

[21] Appl. No.: 575,176

[22] Filed: Dec. 19, 1995

Related U.S. Application Data

[63] Continuation of Ser. No. 236,034, May 2, 1994, abandoned.

[30] Foreign Application Priority Data

May 7, 1993 [JP] Japan ..................... 5-106376

[51] Int. Cl.⁶ ..................... H02N 2/00
[52] U.S. Cl. ..................... 310/323
[58] Field of Search ..................... 310/323

[56] References Cited

U.S. PATENT DOCUMENTS

| | | | |
|---|---|---|---|
| 4,965,482 | 10/1990 | Ohnishi et al. | 310/323 |
| 5,122,700 | 6/1992 | Tamai et al. | 310/323 |
| 5,124,611 | 6/1992 | Tamai et al. | 310/317 |
| 5,162,692 | 11/1992 | Fujimura | 310/323 |
| 5,214,339 | 5/1993 | Naito | 310/316 |
| 5,231,325 | 7/1993 | Tamai et al. | 310/323 |
| 5,274,295 | 12/1993 | Tsukimoto et al. | 310/323 |
| 5,352,949 | 10/1994 | Eguchi et al. | 310/323 |
| 5,376,854 | 12/1994 | Imabayashi et al. | 310/323 |
| 5,410,204 | 4/1995 | Imabayashi et al. | 310/323 |

FOREIGN PATENT DOCUMENTS

| | | | |
|---|---|---|---|
| 0240380 | 10/1988 | Japan | 310/323 |
| 0265576 | 11/1988 | Japan | 310/323 |
| 0016275 | 1/1989 | Japan | 310/323 |
| 0178576 | 8/1991 | Japan | 310/323 |
| 4117185 | 4/1992 | Japan | H02N 2/00 |

*Primary Examiner*—Thomas M. Dougherty
*Attorney, Agent, or Firm*—Fitzpatrick, Cella, Harper & Scinto

[57] ABSTRACT

A vibration actuator includes a substantially rod-shape vibration member, and an electro-mechanical energy conversion element for vibrating the vibration member. The vibration member is vibrated by mechanical energy from the conversion element, thereby moving a member contacting the vibration member, and the vibration member relative to each other. A first notch which is notched in the radial direction and a second notch which is notched in the axial direction to be contiguous with the first notch are formed in the vibration member.

25 Claims, 5 Drawing Sheets

VIBRATION ACTUATOR

This application is a continuation of application Ser. No. 08/236,034 filed May 2, 1994 now abandoned.

BACKGROUND OF THE INVENTION

1. Field of the Invention

The present invention relates to a vibration actuator with a substantially rod-shape vibration member.

2. Related Background Art

As a conventional ultrasonic wave motor, a motor which produces a bending vibration in a ring, and drives a movable member by a frictional force has been put into practical applications in, e.g., an AF mechanism for a camera. However, since such a motor has a ring shape, it requires unexpectedly high cost as a unit including a compression mechanism, and is disadvantageous in terms of cost in a motor application which does not require a hollow structure. Thus, as a motor which has a solid structure and facilitates an arrangement of a compression system, Japanese Laid-Open Patent Application No. 4-117185 has been proposed.

Figure 2:
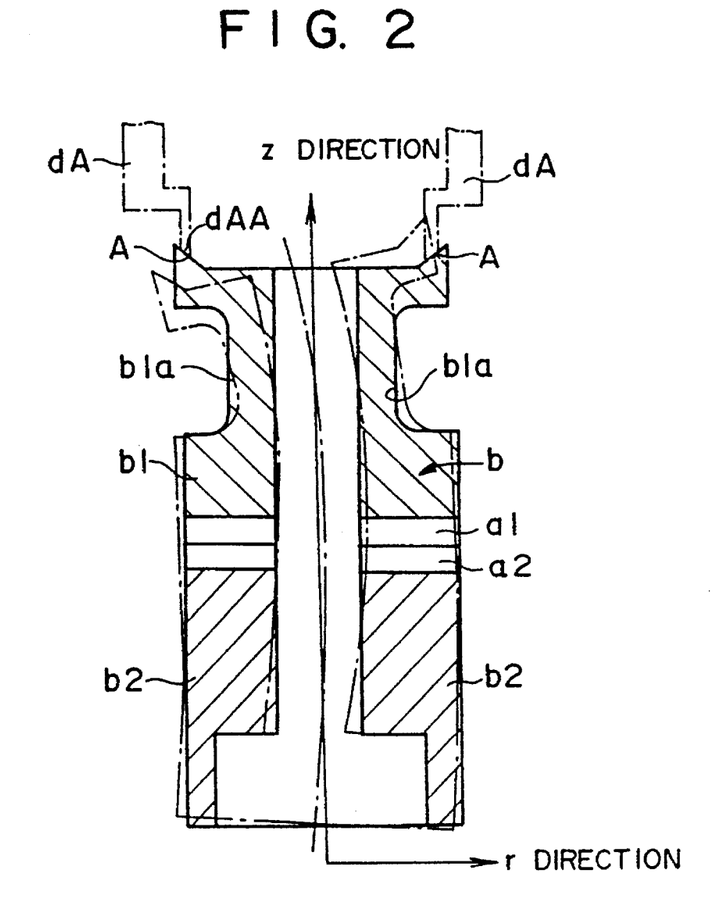
FIG. 2 is a sectional view of a conventional ultrasonic wave motor.

FIG. 2 is a sectional view showing main part of an ultrasonic wave motor according to the proposal. Hollow disk-shape piezoelectric elements a1 and a2 are polarized to (+) and (−) in the direction of thickness to sandwich their central lines therebetween, and are arranged to be positionally shifted by 90°. Upper and lower vibration members b1 and b2 are respectively arranged on opposite sides of the piezoelectric elements a1 and a2. A radially constricted portion b1a is formed in the upper portion of the upper vibration member b1 near a contact portion A. When electrical signals having a phase difference therebetween are respectively applied from a driving circuit (not shown) to the piezoelectric elements a1 and a2, bending vibrations, which temporally have a predetermined phase difference, are generated in different planes of the vibration member. In this manner, the contact surface of the vibration member makes a rotary motion. Note that this principle is known to those who are skilled in the art, and a detailed description thereof will be omitted.

A vibration member side contact portion A in FIG. 2 is used for driving a movable member dA. The movable member dA has a contact portion dAA which is in pressure contact with the contact portion A of vibration member b, and receives a driving force.

Recently, optical devices and OA devices such as printers have been required to be miniaturized. However, in the prior art, when a rod-shape ultrasonic wave motor undergoes miniaturization, since the resonance frequency of a mode utilized in driving decreases in inverse proportion to a square of the total length in accordance with a formula $\omega n = Knd(\sqrt{E/\rho})l^2$ (E=Young's modulus, ρ=density, l=total length, d=diameter, Kn=constant), the following problems are posed:

(1) When driving control is executed by feeding back the phase difference between a detection signal detected by a sensor piezoelectric element and a driving signal, since the detection signal and the driving signal have high frequencies, the phase difference cannot be accurately detected, and control cannot be executed with high accuracy.

Figure 3:
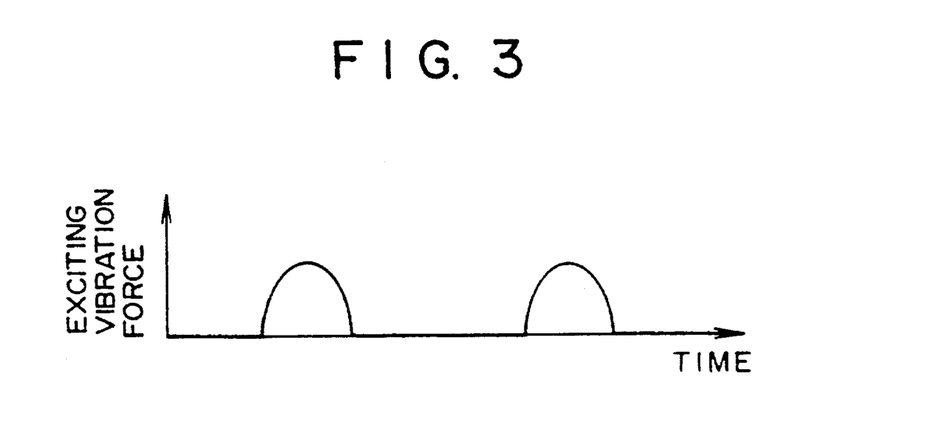
FIG. 3 is a waveform chart showing a vibration force.

(2) In the ultrasonic wave motor, since the entire surface of the movable member is brought into contact with the driving surface of the vibration member, the contact portion of the movable member is provided with elasticity (contact spring portion). The displacement distribution of the vibration member upon driving has a sinusoidal pattern, and an exciting vibration force applied to the contact spring portion which is in pressure contact with the vibration member is half-wave rectified, as shown in FIG. 3.

At this time, the exciting vibration force components include many components of a frequency as high as twice the driving frequency, and if the natural frequency of the contact spring portion is present near this frequency, then the amplitudes of these components are amplified, thus disturbing regular rotation and generating sound noise during a driving operation.

In order to avoid this phenomenon, in the prior art, the natural frequencies of all modes of the contact spring portion are set to be higher than a frequency twice the driving frequency.

However, as described above, when the rod-shape ultrasonic wave motor is miniaturized, if miniaturization is performed while maintaining a similar shape, since the driving frequency increases in inverse proportion to a square of the axial length, the natural frequency of the contact spring portion must be inevitably increased. However, the present inventors have discovered out that when the resiliency of the contact portion becomes too high, the contact portion cannot follow the waviness which is always present on the driving surface, and the motor output is undesirably lowered.

SUMMARY OF THE INVENTION

One aspect of this invention is to provide a vibration actuator which can lower the resonance frequency by forming a first notch extending in a radial direction and a second notch extending in an axial direction to be contiguous with the first notch in a substantially rod-shape vibration member, which vibrates upon energizing of an electro-mechanical energy conversion element.

One aspect of this invention is to provide a vibration actuator which can lower the resonance frequency by fixing a portion of a substantially rod-shape vibration member, which vibrates upon energizing of an electro-mechanical energy conversion element, so as to have a free end in an axial direction.

DETAILED DESCRIPTION OF THE PREFERRED EMBODIMENTS

Figure 1:
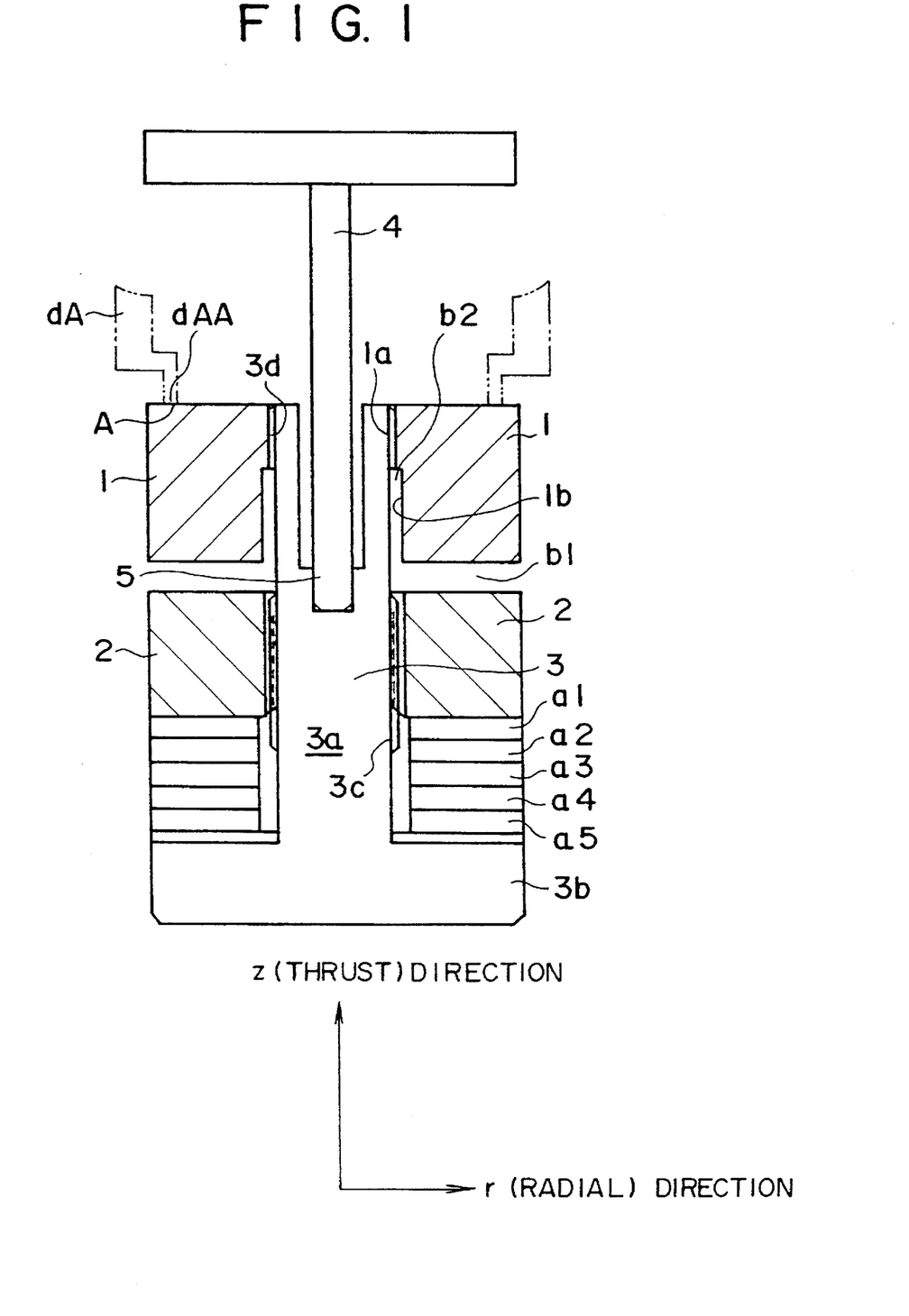
FIG. 1 is a sectional view showing a first embodiment of a rod-shape ultrasonic wave motor according to the present invention.

FIG. 1 is a longitudinal sectional view showing a main part (vibration member) of an ultrasonic wave motor as a vibration actuator according to the first embodiment of the present invention.

Referring to FIG. 1, a metal pin member 3 constitutes a central axial portion of a vibration member. A flange portion 3b is integrally formed on one end portion of a pin main body 3a of the pin member 3. The flange portion 3b clamps piezoelectric element plates $a_1$ to $a_5$ as electro-mechanical energy conversion elements which are used for driving and consist of, e.g., PZT. Also, screw portions 3c and 3d are formed on the pin main body 3a.

Each of the piezoelectric element disks $a_1$ to $a_5$ is formed to have a hollow disk shape. The piezoelectric element disks $a_1$ and $a_2$ which are arranged to be in phase with each other constitute an A phase piezoelectric element for driving, and the piezoelectric element disks $a_3$ and $a_4$ which are similarly arranged constitute a B phase piezoelectric element. The piezoelectric element disk $a_5$ serves as a sensor, and generates an electromotive voltage according to its distortion as a detection signal. The A and B phase piezoelectric elements have a 90° phase difference in space therebetween. Note that each of the A and B phase piezoelectric elements is constituted by two piezoelectric element disks. Alternatively, each of A and B phase piezoelectric elements may be constituted by a single piezoelectric element disk. The piezoelectric element disks $a_1$ to $a_5$ are polarized to (+) and (−) in the direction of thickness to sandwich their central lines therebetween.

A first vibration elastic member 2 is threadably engaged with the screw portion 3c of the pin member 3. The elastic member 2 clamps the piezoelectric element disks $a_1$ to $a_5$ between itself and the flange portion 3b of the pin member. Note that the piezoelectric element disks $a_1$ to $a_5$ are stacked to sandwich electrode disks (not shown) between each two adjacent disks.

A second vibration elastic member 1 as a distal end mass member is threadably engaged with the screw portion 3d of the pin member 3. A screw portion 1a to be threadably engaged with the screw portion 3d is formed on only the upper end portion of the inner circumferential surface of the elastic member 1, and a circumferential groove 1b is formed under the screw portion 1a. Thus, a space portion b2 is formed between the groove portion 1b and the outer circumferential surface of the pin member 3.

When the second and first vibration elastic members 1 and 2 are fixed at predetermined positions illustrated in FIG. 1, a gap b1 which is constricted in the longitudinal direction is formed, thus maintaining the independence of the second vibration elastic member 1.

More specifically, since a portion of the second vibration elastic member 1 is supported by the pin member 3, even when the apparent length, in the axial direction, of the vibration member is shortened, the length of the vibration member is prolonged by the length, in the axial direction, of the space portion b2. In this manner, even when the size of the vibration member is decreased, the natural frequency can be lowered.

Note that the gap b1 is notched in the radial direction when viewed with respect to the vibration member as a whole, and the groove portion 1b corresponds to a second notch notched in the axial direction to be contiguous with a first notch (gap b1).

Note that a support pin 4 is fitted under pressure in the pin member 3 at the node position of a driving vibration.

When driving signals having a phase difference therebetween are applied from a driving circuit (not shown) to the A and B phase piezoelectric elements, vibrations, which temporally have a predetermined phase difference, are generated in different planes as in the prior art shown in FIG. 2. In this manner, the surface of the vibration member makes a rotary motion. Note that this principle is known to those who are skilled in the art, and a detailed description thereof will be omitted. In this embodiment, as compared to the prior art, since the cylindrical groove portion (space portion) b2 is present between the second vibration elastic member 1 and the pin member 3, the resonance frequency of a mode to be utilized in driving can be remarkably lowered without increasing the length, in the thrust direction, of the entire motor.

As can be seen from FIG. 1, with a method of simply prolonging the length, in the radial direction, of the gap b1, since the support pin 4 is fitted under pressure in a node portion 5 of a driving vibration, the thickness of the press fitting portion of the pin member 3 decreases, resulting in an adverse influence such as an increase in support loss. As a result of calculations using an FEM, it was found that when the total length was 11.5 mm, the outer diameter was 5 mm, and the length, in the thrust direction, of the space portion b2 was 2 mm, the resonance frequency of the 1st-order mode was lowered from 53.9 kHz to 34.6 kHz as compared to a case without the space portion b2, providing a reduction of 19.3 kHz.

Note that the second vibration elastic member 1 may consist of a material different from that of the first vibration elastic member 2 and the pin member 3. In this case, if the material of the second vibration elastic member 1 is selected to have a larger specific gravity than those of other members, then the resonance frequency of a mode used in driving can be further lowered as compared to a case wherein the elastic member 1 consists of the same material as that of the elastic member 2, and the like.

Figure 4:
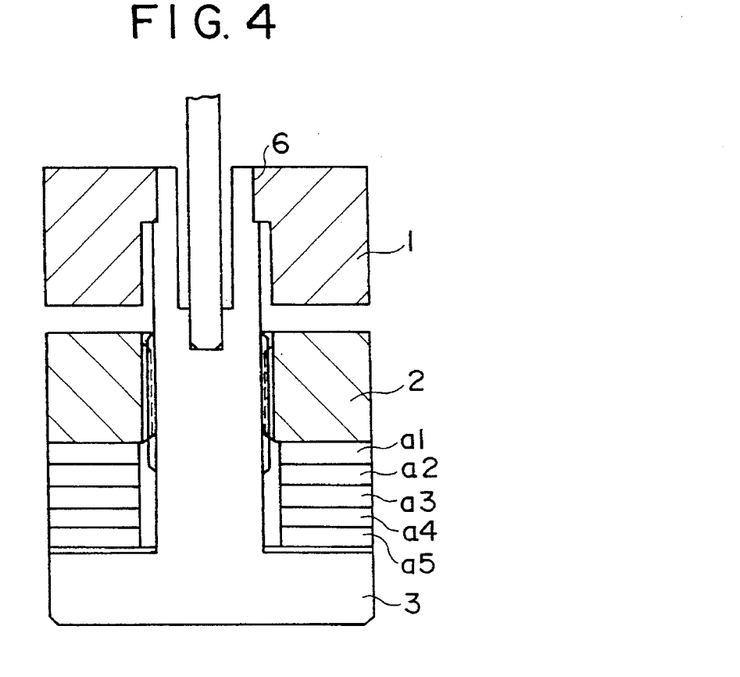
FIG. 4 is a sectional view showing a second embodiment of the rod-shape ultrasonic wave motor.

FIG. 4 shows the second embodiment. In this embodiment, the pin member 3 and the second vibration elastic member 1 are fixed to each other by adhesion, press fitting, or the like. Since a fixing portion 6 by means of adhesion, press fitting, or the like does not easily cause nonuniformity of rigidity as compared to threadable engagement in the first embodiment, this embodiment can eliminate an adverse influence of nonuniformity on driving as compared to the first embodiment.

Figure 5:
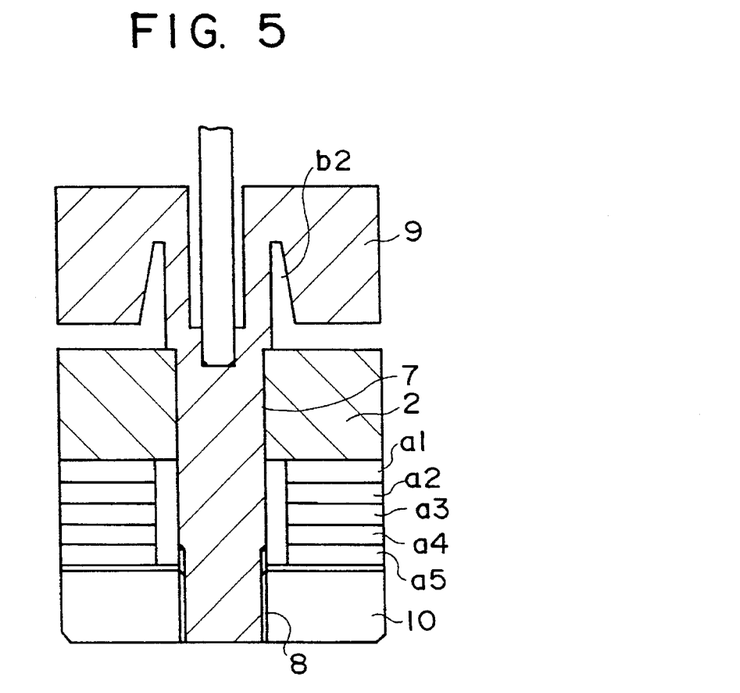
FIG. 5 is a sectional view showing a third embodiment of the rod-shape ultrasonic wave motor.

FIG. 5 shows the third embodiment. In this embodiment, a central shaft and the second vibration elastic member are integrated to constitute an integrated bolt 9. The first vibration elastic member 2 and the integrated bolt 9 are fixed to each other by a fixing portion 7 by means of adhesion, press fitting, or fitting. A lower end vibration elastic member 10 is coupled to the integrated bolt 9 via a screw coupling portion 8, and clamps the piezoelectric element disks $a_1$ to $a_5$ between itself and the bolt 9. In this embodiment, since the screw coupling portion is smaller than that in the first embodiment, an adverse influence of nonuniformity of the screw coupling portion on driving can be eliminated. The groove portion (space portion) b2 has a circular truncated conical shape in consideration of the easy manufacture of the integrated bolt 9.

Figure 6:
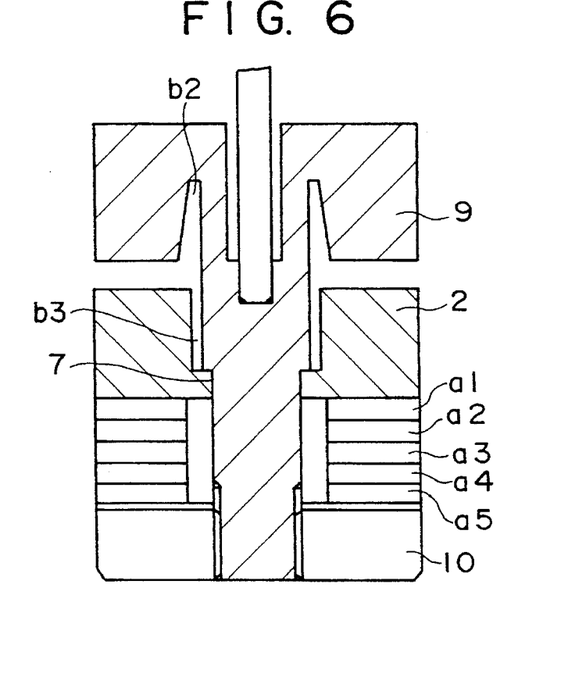
FIG. 6 is a sectional view showing a fourth embodiment of the rod-shape ultrasonic wave motor.

FIG. 6 shows the fourth embodiment. In this embodiment, the fixing portion 7 between the first vibration elastic member 2 and the integrated bolt 9 is shortened as compared to that in the third embodiment, and a cylindrical groove portion (space portion) b3 is present in the remaining portion.

Therefore, in this embodiment, the rigidity of the entire structure can be further lowered as compared to the third embodiment having only the space portion b2 with a circular truncated conical shape, and the resonance frequency for driving can be lowered more largely.

Figure 7:
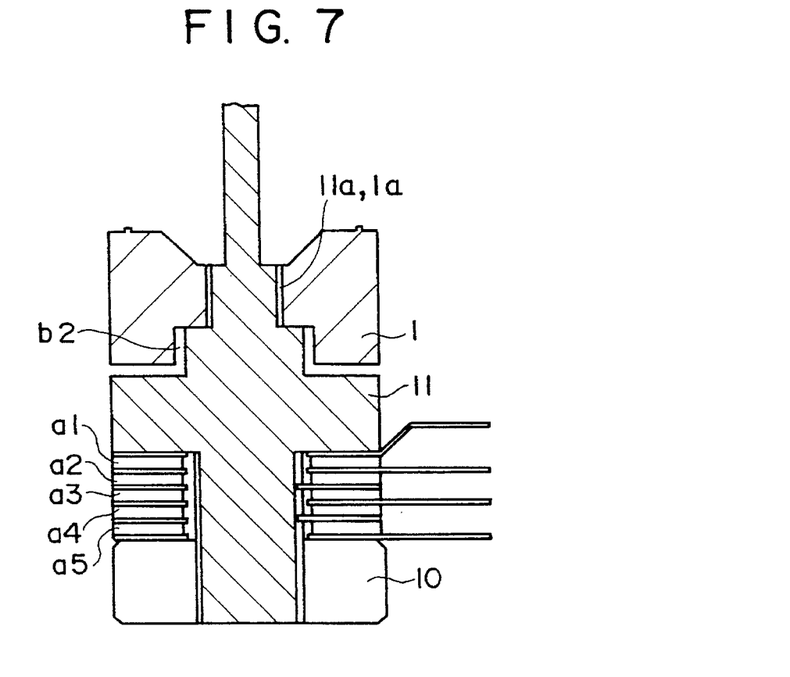
FIG. 7 is a sectional view showing a fifth embodiment of the rod-shape ultrasonic wave motor.

FIG. 7 shows the fifth embodiment. In this embodiment, a central shaft, the first vibration elastic member, and the support pin are integrated to constitute an integrated bolt 11. The second vibration elastic member 1 and the integrated bolt 11 are fixed to each other by screw fastening (screw portions 11a 1a). In this embodiment, since the support pin is integrated as well, the number of parts can be decreased.

AS described above, according to the first to fifth embodiments, the resonance frequency of a mode to be utilized in driving can be remarkably lowered without increasing the total length of the vibration member. As a result, when driving control is performed by utilizing a detection signal from the sensor piezoelectric element, control accuracy can be improved. In addition, since the resiliency of the contact portion with the movable member can be lowered, the followability to the movable member can be improved. Therefore, miniaturization of a rod-shape ultrasonic wave motor can be easily realized.

Figure 8:
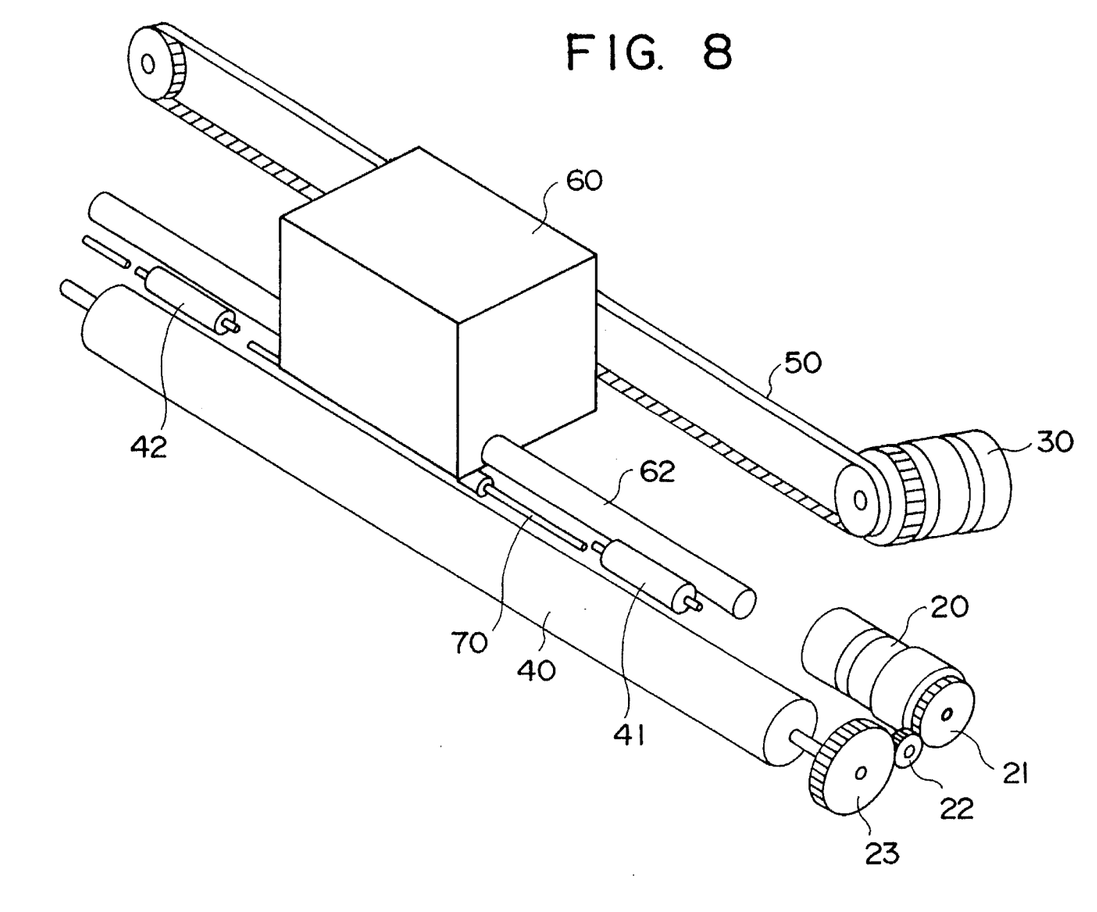
FIG. 8 is a perspective view showing a main part of a printing apparatus using the ultrasonic wave motor of each of the embodiments as a driving source.

FIG. 8 shows a printing apparatus which uses an ultrasonic wave motor of one of the first to fifth embodiments described above as a driving source. Referring to FIG. 8, a first ultrasonic wave motor 20 serves as a driving source for feeding a sheet. A second ultrasonic wave motor 30 serves as a driving source for moving a carriage. Gears 21, 22, and 23 are rotated by a rotation force output from the first ultrasonic wave motor 20, thereby rotating a feed roller 40. A sheet such as a paper sheet, a film, or the like is clamped between the feed roller 40 and guide rollers 41 and 42, and is fed in the carriage direction upon rotation of the feed roller 40.

A timing belt 50 is driven by a rotation force output from the second ultrasonic wave motor 30, and a carriage 60 fixed to the timing belt 50 is moved along a guide shaft in a direction perpendicular to the sheet feed direction. A printing device (e.g., an ink-jet printing device, etc.) for printing is assembled in the carriage 60. A magnetic linear encoder 70 outputs position information of the carriage 60.

What is claimed is:

1. A vibration actuator comprising:

a substantially rod-shape vibration member, said vibration member including a recess formed therein, the recess including a first recess portion formed about the entire circumference of the vibration member and extending radially inward from the outer circumference of the vibration member, and a second recess portion extending in an axial direction of the vibration member, the second recess portion being located at a radially interior portion of the first recess portion;

an electro-mechanical energy conversion element portion for generating a vibration in said vibration member; and a contact member contactable to said vibration member and arranged for receiving the vibration therefrom to cause relative movement between said vibration member and said contact member.

2. A vibration actuator according to claim 1, wherein said first and second recess portions are annular.

3. A vibration actuator according to claim 2, wherein said second recess portion has a truncated conical cross-section.

4. A vibration member according to claim 1, wherein the vibration generated in said vibration member by said electro-mechanical energy conversion element portion causes a contact portion of said vibration member to move in a circular or elliptic motion.

5. A vibration member according to claim 4, wherein said electro-mechanical conversion element portion comprises a plurality of electro-mechanical energy conversion elements which are stacked in the axial direction of said vibration member.

6. A vibration member according to claim 5, wherein said plurality of electro-mechanical energy conversion elements include a plurality of first piezoelectric elements each having an electrode configuration arranged to be in special phase with each other, a plurality of second piezoelectric elements each having an electrode configuration and arranged to have a spacial phase difference from said first piezoelectric elements, and a third piezoelectric element forming a sensor.

7. An apparatus for moving an object to be moved using a vibration actuator as a driving source, the apparatus comprising:

a vibration actuator comprising:

a substantially rod-shape vibration member, said vibration member including a recess formed therein, the recess including a first recess portion formed about the entire circumference of the vibration member and extending radially inward from the outer circumference of the vibration member, and a second recess portion extending in an axial direction of the vibration member, the second recess portion being located at a radially interior portion of the first recess portion;

an electro-mechanical energy conversion element portion for generating a vibration in said vibration member; and a contact member contactable to said vibration member and arranged for receiving the vibration therefrom to cause relative movement between said vibration member and said contact member; and a movable object functionally engagable to one of said vibration member and said contact member.

8. An apparatus according to claim 7, wherein said apparatus is a printing apparatus, and said contact member is a movable member for feeding a sheet in the printing apparatus.

9. An apparatus according to claim 7, wherein said apparatus is a printing apparatus, and said contact member is a movable member for moving a carriage in the printing apparatus.

10. A vibration actuator comprising:

a substantially rod-shape vibration member comprising a central shaft portion, a first elastic member portion supported on said central shaft portion at a first axial location, and a second elastic member portion located adjacent said first elastic member and supported on said central shaft portion at a second axial location, at least one of said first and second elastic member portions having an axial length and being supported on said central shaft portion along only a portion of the axial length of said at least one elastic member portion;

an electro-mechanical energy conversion element for generating a vibration in said vibration member; and a contact member contactable to said vibration member and arranged for receiving the vibration therefrom to cause relative movement between said vibration member and said contact member.

11. A vibration actuator according to claim 10, wherein said at least one elastic member portion is threadably coupled to said central shaft portion.

12. A vibration actuator according to claim 10, wherein each of said first and second elastic member portions has an axial length and is supported on said central shaft portion along only a portion of the axial length of said elastic member portion.

13. A vibration actuator according to claim 10, wherein said at least one elastic member portion is supported on said central shaft portion at only a portion of the axial length thereof by forming a recess in said at least one elastic member portion extending in a direction of the axial length thereof between said at least one elastic member portion and said central shaft portion, one end of said recess terminating at a supporting portion of said at least one elastic member portion, and the other end of said recess being open.

14. A vibration actuator according to claim 10, wherein said second elastic member portion consists of a material having a specific gravity different from a specific gravity of said first elastic member portion.

15. An apparatus for moving an object to be driven using a vibration actuator as a driving source, the apparatus comprising:
- a vibration actuator comprising:
  - a substantially rod-shape vibration member comprising a central shaft portion, a first elastic member portion supported on said central shaft portion at a first axial location, and a second elastic member portion located adjacent said first elastic member and supported on said central shaft portion at a second axial location, at least one of said first and second elastic member portions having an axial length and being supported on said central shaft portion along only a portion of the axial length of said at least one elastic member portion;
  - an electro-mechanical energy conversion element for generating a vibration in said vibration member; and
  - a contact member contactable to said vibration member and arranged for receiving the vibration therefrom to cause relative movement between said vibration member and said contact member; and
- a movable object functionally engagable to one of said vibration member and said contact member.

16. An apparatus according to claim 15, wherein said apparatus is a printing apparatus, and said contact member is a movable member for feeding a sheet in the printing apparatus.

17. An apparatus according to claim 15, wherein said apparatus is a printing apparatus, and said contact member is a movable member for moving a carriage in the printing apparatus.

18. A vibration actuator according to claim 13, wherein said recess is annular and has a truncated conical cross-section.

19. A vibration actuator comprising:
- a substantially rod-shape vibration member, said vibration member including a first recess formed about the entire circumference of the vibration member and extending radially inward from the outer circumference of the vibration member, and a second recess contiguous with said first recess and extending in an axial direction of the vibration member, the second recess being located at a position radially interior to the first recess;
- an electro-mechanical energy conversion element portion for generating a vibration in said vibration member; and
- a contact member contactable to said vibration member and arranged for receiving the vibration therefrom to cause relative movement between said vibration member and said contact member.

20. A vibration actuator according to claim 19, wherein said first and second recesses are annular.

21. A vibration actuator according to claim 20, wherein said second recess has a truncated conical cross-section.

22. A vibration actuator according to claim 19, wherein the vibration generated in said vibration member by said electro-mechanical energy conversion element portion causes a contact portion of said vibration member to move in a circular or elliptic motion.

23. An apparatus for moving an object to be moved using a vibration actuator as a driving source, comprising:
- a substantially rod-shape vibration member, said vibration member including a first recess formed about the entire circumference of the vibration member and extending radially inward from the outer circumference of the vibration member, and a second recess contiguous with said first recess and extending in an axial direction of the vibration member, the second recess being located at a position radially interior to the first recess;
- an electro-mechanical energy conversion element portion for generating a vibration in said vibration member; and
- a contact member contactable to said vibration member and arranged for receiving the vibration therefrom to cause relative movement between said vibration member and said contact member.

24. An apparatus according to claim 23, wherein said apparatus is a printing apparatus, and said contact member is a movable member for feeding a sheet in the printing apparatus.

25. An apparatus according to claim 23, wherein said apparatus is a printing apparatus, and said contact member is a movable member for moving a carriage in the printing apparatus.

* * * * *

UNITED STATES PATENT AND TRADEMARK OFFICE
CERTIFICATE OF CORRECTION

PATENT NO. : 5,574,326
DATED : November 12, 1996
INVENTOR(S) : ICHIRO CHIBA, ET AL.

It is certified that error appears in the above-indentified patent and that said Letters Patent is hereby corrected as shown below:

TITLE PAGE:

<u>At [56] References Cited</u>

"5,376,854" should read --5,376,858--.

<u>Column 5</u>

Line 8, change "largely." to --greatly.--.
Line 14, "11a 1a)." should read --11a, 1a).
Line 16, "AS" should read --As--.

<u>Column 6</u>

Line 17, "spacial" should read --spatial--.

Signed and Sealed this

Fifteenth Day of April, 1997

Attest:

BRUCE LEHMAN

*Attesting Officer*    Commissioner of Patents and Trademarks